US011936603B2

(12) United States Patent
Cundall et al.

(10) Patent No.: US 11,936,603 B2
(45) Date of Patent: *Mar. 19, 2024

(54) GENERATING MODIFIED IMAGES FOR DISPLAY

(71) Applicant: Microsoft Technology Licensing, LLC, Redmond, WA (US)

(72) Inventors: Samuel Robert Cundall, Mercer Island, WA (US); Nicolas Gunnar Alexander Nuzzaci, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,965

(22) Filed: Feb. 13, 2023

(65) Prior Publication Data

US 2023/0198923 A1  Jun. 22, 2023

Related U.S. Application Data

(63) Continuation of application No. 17/341,795, filed on Jun. 8, 2021, now Pat. No. 11,601,387.

(51) Int. Cl.
*H04L 51/08* (2022.01)
*G06T 13/80* (2011.01)
*H04L 51/216* (2022.01)

(52) U.S. Cl.
CPC .............. *H04L 51/08* (2013.01); *G06T 13/80* (2013.01); *H04L 51/216* (2022.05)

(58) Field of Classification Search
CPC ........ H04L 51/08; H04L 51/216; G06T 13/80
See application file for complete search history.

(56) References Cited

U.S. PATENT DOCUMENTS 9,684,430 B1   6/2017 Perigault
10,410,180 B2 *  9/2019 Druck ................. G06F 3/04817
(Continued)

FOREIGN PATENT DOCUMENTS

WO   2015183755 A1   12/2015

OTHER PUBLICATIONS

"A Guide To Microsoft Teams For Beginners: 101", Retrieved From: https://web.archive.org/web/20210328034436if_/ https://www.officesolutionsit.com.au/hubfs/Content/Microsoft%20Teams/Office%20Solutions%20IT%20-%20Microsoft%20Teams%20101%20guide.pdf, Mar. 28, 2021, 22 Pages.
"Sublime Text Community Documentation", Retrieved From: https://web.archive.org/web/20210509010829/https://docs.sublimetext.io/guide/extensibility/completions.html, May 9, 2021, 5 Pages.
(Continued)

*Primary Examiner* — Austin J Moreau
(74) *Attorney, Agent, or Firm* — Schwegman Lundberg Woessner, P.A.

(57) ABSTRACT

A method and system for displaying an image in a communication thread accessible to a first and second user are disclosed, including receiving an indication of a selection of a first image by the first user for display in the communication thread, analyzing user attribute settings of the first user or the second user to determine if at least one of the first user or the second user has a user attribute setting corresponding to a customizable aspect of the selected first image, and causing, based on the analyzing, in different first and second modes, one of the selected first image or a modified image based on the selected first image to be displayed in the communication thread.

20 Claims, 11 Drawing Sheets

(56) References Cited

U.S. PATENT DOCUMENTS

| | | |
|---|---|---|
| 10,505,875 B1 | 12/2019 | Jenks et al. |
| 10,659,415 B1 | 5/2020 | Ledet |
| 10,979,375 B2* | 4/2021 | Young .................. H04L 51/10 |
| 11,568,131 B1 | 1/2023 | Cundall |
| 2006/0136284 A1 | 6/2006 | Awerbuch et al. |
| 2010/0083148 A1* | 4/2010 | Finn ........................ A63F 13/12 |
| | | 715/764 |
| 2013/0103766 A1* | 4/2013 | Gupta .................. G06Q 10/107 |
| | | 709/206 |
| 2015/0121251 A1 | 4/2015 | Kadirvel |
| 2017/0083174 A1* | 3/2017 | Tobens, III ........... G06F 3/0485 |
| 2018/0075766 A1 | 3/2018 | Martin et al. |
| 2018/0329592 A1 | 11/2018 | Ramarao et al. |
| 2020/0034033 A1 | 1/2020 | Chaudhri et al. |
| 2021/0096729 A1* | 4/2021 | Dalonzo ............ H04M 1/72436 |
| 2022/0392135 A1 | 12/2022 | Cundall et al. |
| 2023/0144518 A1 | 5/2023 | Cundall |
| 2023/0144975 A1 | 5/2023 | Cundall |

OTHER PUBLICATIONS

"International Search Report and Written Opinion Issued in PCT Application No. PCT/US22/040385", dated Nov. 24, 2022, 17 Pages.

"International Search Report and Written Opinion Issued in PCT Application No. PCT/US22/040386", dated Nov. 24, 2022, 14 Pages.

"Notice of Allowance Issued in U.S. Appl. No. 17/524,314", dated Dec. 19, 2022, 10 Pages.

"Final Office Action Issued in U.S. Appl. No. 17/341,962", dated Jan. 26, 2023, 23 Pages.

"Non-Final Office Action Issued in U.S. Appl. No. 18/090,858", dated Apr. 11, 2023, 13 Pages.

"Notice of Allowance Issued in U.S. Appl. No. 18/090,858", dated Aug. 2, 2023, 7 Pages.

EPO Communication Pursuant to Rules 161(1) & 162 Received in European Patent Application No. 22731002.6, dated Jan. 16, 2024, 3 pages.

* cited by examiner

GENERATING MODIFIED IMAGES FOR DISPLAY

CROSS-REFERENCE TO RELATED APPLICATIONS

This application is a continuation of prior application Ser. No. 17/341,795, filed on Jun. 8, 2021, which is incorporated by reference herein in its entirety.

TECHNICAL FIELD

The present disclosure generally refers to methods and systems for generating modified images for display in accordance with some embodiments.

BACKGROUND

The use of software and hardware technologies have become a commonplace method of communication between two or more people. Today, instant messaging or chat applications have become one of the primary ways of keeping in touch with other people. However, such virtual messages lack the ability to convey emotions and nuanced human behaviors that are perceivable in face-to-face interactions.

SUMMARY

Communication between two or more people can occur almost instantaneously using electronic devices. Although technology improvements allow people to send and receive text, images, audio, and other electronic media with impressive speed and reliability, virtual interactions can still feel stale and impersonal. To aid in the human connection between people over electronic media, methods and systems are contemplated herein to provide delightful experiences through various mechanisms within a communication thread.

Embodiments of the present disclosure include a method and system for displaying an image in a communication thread. The computer system includes one or more processors, a memory storing computer-executable instructions that when executed, cause the one or more processors to perform the following operations of receiving an indication of a selection of a first image by a first user for display in the communication thread, wherein the communication thread is accessible to the first user and a second user, analyzing user attribute settings of the first user or the second user to determine if at least one of the first user or the second user has a user attribute setting corresponding to a customizable aspect of the selected first image, and causing, based on the analyzing, one of the selected first image or a modified image based on the selected first image to be displayed in the communication thread. Causing one of the selected first image or the modified image can include, in a first mode, if the user attribute settings do not correspond to the customizable aspect of the selected first image, causing the selected first image to be displayed in the communication thread, or, in a second mode, if one or more of the user attribute settings correspond to the customizable aspect of the selected first image, generating the modified image based on the selected first image according to the one or more user attribute settings and causing the generated modified image to be displayed in the communication thread.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The disclosed aspects will hereinafter be described in connection with the appended drawings that are provided to illustrate and not to limit the disclosed aspects.

DETAILED DESCRIPTION

Figure 1:
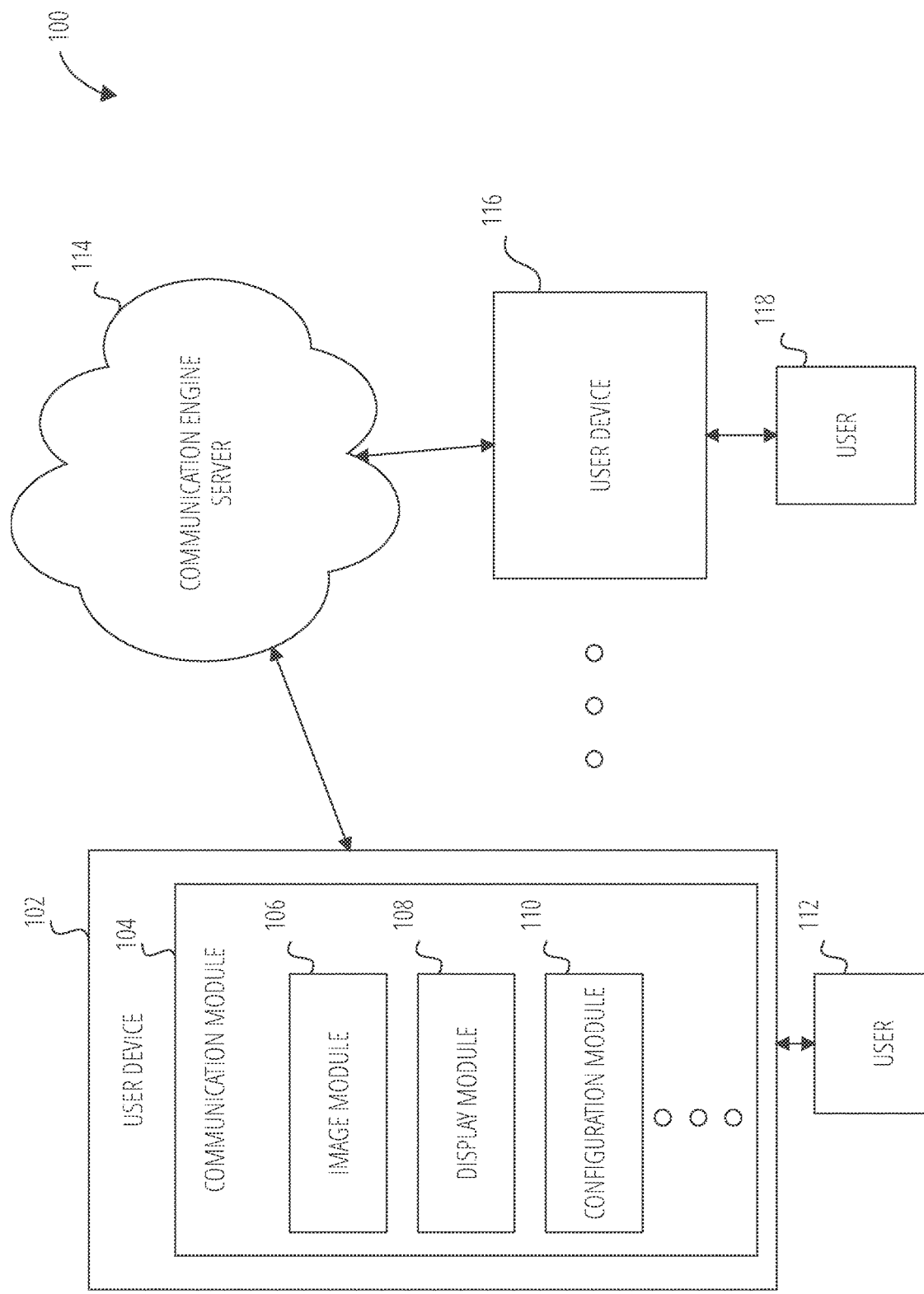
FIG. 1 is a block diagram of an example computer system for combining data in a communication stream in accordance with some embodiments.

Images and emojis sent and received in communication feeds such as text messaging and video calls provide useful emotional feedback to aid in communication. However, conventional images and text messages lack features that allow further emotional connection and feedback. The images and emojis in conventional applications are presented in sequential order (e.g., in order of when they are sent) and are placed apart within the communication stream.

Current technologies do not provide a way for the images and emojis to interact and be combined. A technical problem exists in creating automated, context-aware, supplemental communication based on received communication content of a communication thread. Conventional systems do not provide a solution for accurately identifying supplemental communication to be automatically provided within a communication stream based on context of the communication within the communication stream. Further, conventional systems only provide a predetermined, selectable menu of images necessitating manual input from a user. The technical solution contemplated herein provides an automated system for identifying, based on the context of communication, an appropriate system generated image or animation to be provided within the communication stream without human or manual input.

Having a computer implemented system provides a technical solution to the technical problem described above by implementing a solution that identifies, based on context of messages, whether to generate an animation. By performing context identifying processes involving rules, natural language processing and/or machine vision to identify not only the content of messages, but also the context of the messages, the computer implemented system is able to provide a technical effect of providing automated animations that are appropriate within the context of the messages.

A further technical problem exists for communications in that individuals may have preferences for the look and feel of their images based upon various properties of themselves. Due to the proliferation of these preferences, the menus for selection of the different available images such as emojis may become vary long and cumbersome. In addition, offering customized preferences for images featuring representations of both users (e.g., an emoji with two users hugging) may explode the number of available options. For users of small devices, this may be cumbersome to select and may take up enormous screen space, or require navigation of many menus.

Additionally, said device provides a technical solution to the technical problem described above by determining, using composite image generation rules, when to and when not to automatically generate composite images based upon rules that specify when and under which circumstances a composite image is generated based upon properties of a participant in the communication. This relieves the user of having to navigate through multiple sub-menus and also saves screen space on smaller devices. In addition, this saves computing resources of these devices by not having to include instructions for providing these selection techniques for users and by not having to display those selection methods.

The present invention overcomes deficiencies of conventional systems by providing an integrated method embodied in computer software for use with a computer for the context based generation of animations and composite images thereby allowing efficient and immersive conversation experiences that were previously unattainable.

Additionally, as computer systems improve in communication and bandwidth, it is advantageous to utilize the capabilities of automated systems for combining data in a communication stream to generate an animation and/or synthesized image that provides useful emotional connection and feedback to aid in communication.

It is understood that this solution is not solely reserved for combining data in a communication stream but may include any application providing content and/or messages to users.

The inventive subject matter will now be discussed with reference to several example implementations. It is to be understood that these implementations are discussed for enabling those skilled in the art to better understand and thus implement the embodiments of the present disclosure, rather than suggesting any limitations on the scope of the present disclosure.

Examples disclosed herein are directed to methods, apparatus comprising several modules and apparatus comprising one or more processors and memory embodied with executable instructions for combining data in a communication stream.

Having generally provided an overview of some of the disclosed examples, attention is drawn to the accompanying drawings to further illustrate some additional details. The illustrated configurations and operational sequences are provided to aid the reader in understanding some aspects of the disclosed examples. The accompanying figures are not meant to limit all examples, and thus some examples may include different components, devices, or sequences of operation while not departing from the scope of the disclosed examples discussed herein. In other words, some examples may be embodied or may function in different ways than those shown.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

Additionally, it should be noted that emojis and emoticons are both referenced herein as images and the subject matter described herein is applicable to messages with both emojis and emoticons as well as other images or representations of images. Emojis are static or animated images, symbols, or icons that depict various objects. Images are selected by a user (from a list or using short-cut key sequences) and are transmitted to another device in a conversation as a code (e.g., a Unicode code). The other device interprets the code into an emoji image and displays the emoji. Emoticons are images made up of a combinations of characters (e.g., keyboard characters) that approximate objects. Example emoticons include facial expressions such as a smiley face emoticon :) which approximates a smiling face. In some examples, emojis and emoticons may be used to express or convey emotions.

FIG. 1 illustrates a block diagram of an example computer system for combining data in a communication stream in accordance with some embodiments. System 100 provides services for a user 112 of user device 102 through a communication engine server 114 in communication with user device 102. User 112 of user device 102 may communicate directly with user 118 of user device 116 or through communication engine server 114. User device 102 and user device 116 may exchange messages including text based messages, animations, images, hyperlinks, audio clips, video clips, etc. Further there may be more user devices not shown in FIG. 1 in communication with either user device 102 and/or user device 116 that may also exchange messages with user device 102 and/or user device 116.

User device 102 includes a communication module 104 that may be used to communicate messages between a user devices via communication engine server 114. of the communication engine server 114. Communication module 104 of user device 102 may include image module 106, display module 108, and configuration module 110 among others. User device 102 may include various other modules and sub-modules not shown in FIG. 1.

Image module 106 can be used to receive, send, and store messages within communication module 104 that pertains to images. Image module 106 may also include a repository of images of the user 112 taken by or stored on user device 102. Images may include emojis, emoticons, photographs, drawings, or the like.

Display module 108 is configured to display messages (and other visual content) within the communication module 104 on user device 102.

Configuration module 110 is configured to maintain device and/or user specific settings including selected image settings and user attribute settings. User attribute settings may include skin tone, eye color, hair color, height, weight, and various other user defining features that may be selected by the user or on the behalf of the user (e.g., automatically selected by communication engine server 114). The user attribute settings may be stored in a user profile data structure.

For example, user 112 is of Asian descent and selects a skin-tone setting of shade 3. The selected skin-tone setting may be stored in configuration module 110 and used to adjust baseline image skin tones to match the user's selected skin tone. A smiling emoji may have a baseline skin tone shade of shade 1 but when selected for use by the user 112, the smiling emoji is updated to have a skin tone shade of 3.

Generating Animations for Display

Figure 2A:
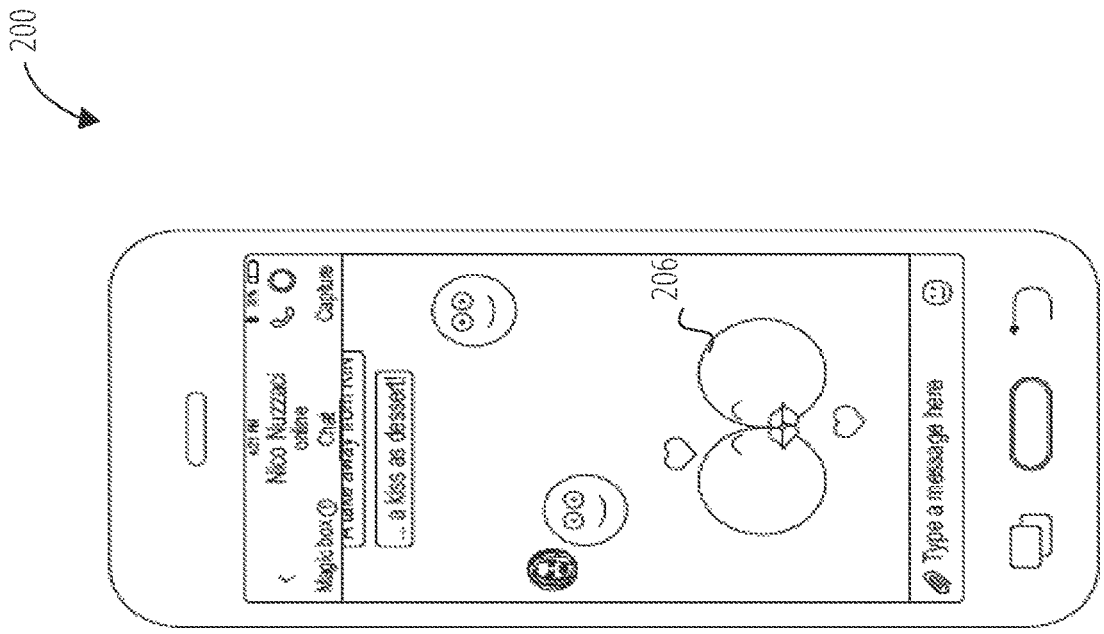
FIG. 2A-2C illustrates a view of a user interface for combining data in a communication stream in accordance with some embodiments.

FIG. 2A illustrates a view of a user interface for combining data in a communication stream in accordance with some embodiments. A first view of a user interface of user device 200 includes an example view of a communication platform (e.g., chat window for a conversation group) that provides an interface to communicate with one or more people. A user of user device 200 sends data in a communication stream as an emoji 202. The emoji 202 displays an image (such as an emoji or animation) of a kissing face.

Figure 2B:
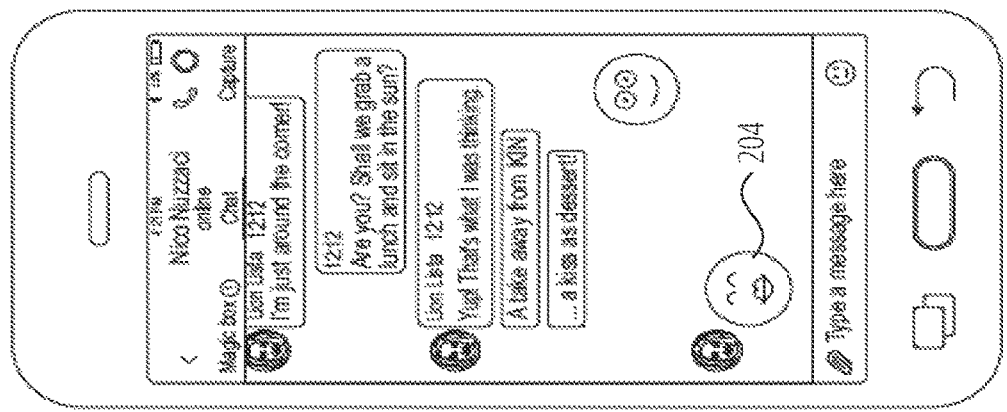

FIG. 2B illustrates an intermediary user interface for combining data in a communication stream in accordance with some embodiments. A second view of a user interface of user device 200 in FIG. 2B shows "Nico Nuzzaci" responding within the communication platform. In response to the user's emoji 202, a second emoji 204 is received through the communication platform. Second emoji 204 is the same emoji as emoji 202 and displays a kissing face image (such as an emoji or animation). The communication engine server (e.g., communication engine server 114, FIG. 1) receives both data in the communication stream (e.g., emoji 202 and second emoji 204). Based on the context within the communication stream and one or more rules, the communication engine server generates an animation for display by both participants in the communication stream. In some embodiments, there are more than two participants in the communication stream and each participant device receives the animation for display. For example, two emojis kissing.

The communication engine server (e.g., communication engine server 114, FIG. 1) receives both data in the communication stream (e.g., emoji 202 and second emoji 204). Based on the context within the communication stream, the communication engine server generates an animation for display by both participants in the communication stream. For example, the context may be receiving both emojis within a predetermined number of messages.

In another example, the context may be discerned using natural language processing, or other suitable language processing or image processing methodology to identify a theme or subject of the communication stream. The communication stream may include messages about a birthday party. The communication engine server is configured to parse the messages and identify that the content of the messages may relate to a gathering or a celebration. One or more rules may identify that for conversations about gatherings or celebrations, a celebration animation is displayed. In some embodiments, there are more than two participants in the communication stream and each participant device receives the animation for display.

The communication engine server may be configured to determine a first and a second context of a first and second message, respectively. Each of the first and second messages are analyzed to determine what the message is about based on the content of the message. In some embodiments, the context of a message is determined by the content of the message if the message is a text message. If the message is an image message (e.g., emoji) the context may be determined by using a look-up table separating emojis into various contexts. In one example, a received image message is an emoji of a crying face. The crying face emoji is predetermined to have a context of a sad emotion. In another example, as shown in FIG. 2A, Nico receives emoji 202, a kissing face emoji. The communication engine server may discern the context of the first message as an affectionate message, based on the kissing emoji. Subsequently, the second message received in FIG. 2B as emoji 204 is another kissing face emoji. The context of the second message is also determined to be an affectionate message. The communication server may then use one or more defined rules to determine that the first context of the first message (emoji 202) and the second context of the second message (emoji 204) satisfies an animation condition. For example, the condition may be receipt, within a specified number of messages between them, of two messages with affectionate images or content. The context may be determined using natural language processing (NLP) algorithms from text of messages, a categorization of emojis or emoticons, and/or the like.

In some examples, a first message may be a text-based message such as "I love you" which is determined to be affectionate by an NLP algorithm (or other classifier) and a second message may be a kissing face emoji—which is classified as an affectionate emoji by the system. The system may determine that two messages were sent within a predetermined number of messages of each other and may initiate a kissing animation. The animation may include the kissing face emoji and may include either a default emoji representing the person who typed the "I love you" message or may include a last-used emoji from that person that is of a same type (e.g., kissing faces). Thus, the communication engine server uses the one or more context defined rules to identify an appropriate animation sequence corresponding to the first and second context of the first and second message.

Figure 2C:
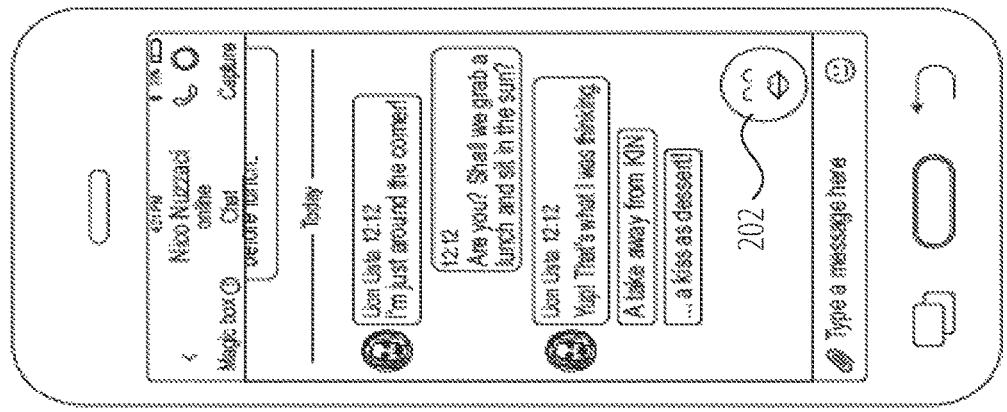

FIG. 2C illustrates an exemplary user interface for combining data in a communication stream in accordance with some embodiments. A third view of user interface of user device 200 in FIG. 2C shows a display of the generated animation 206. Generated animation 206 is created based on one or more trigger conditions and animation instructions (discussed in more detail with respect to FIGS. 5-6). The animation is generated based upon the animation sequence defined by the one or more defined rules and may include content from at least one of the first and second messages. For example, the analyzed context of the first message and the second message triggers the generation of an animation based upon a rule. The content of the first message is used in the generated animation. The content of the second message may or may not be part of the generated animation. In some embodiments, generated animation 206 includes a corresponding audio clip. The audio clip may include kissing sounds and end corresponding to the ending of the animation.

Figure 3A:
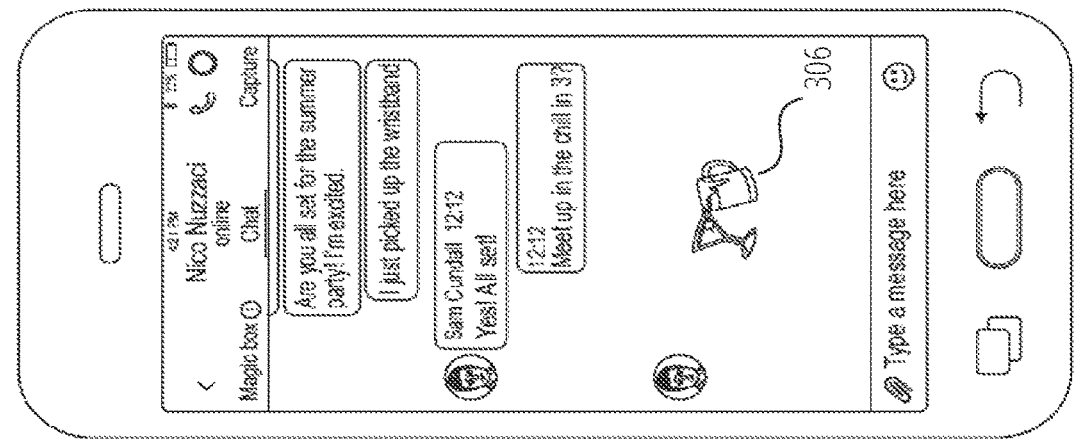
FIG. 3A-3C illustrates a view of a second example user interface application for combining subsequent data in a communication stream in accordance with some embodiments.
Figure 3B:
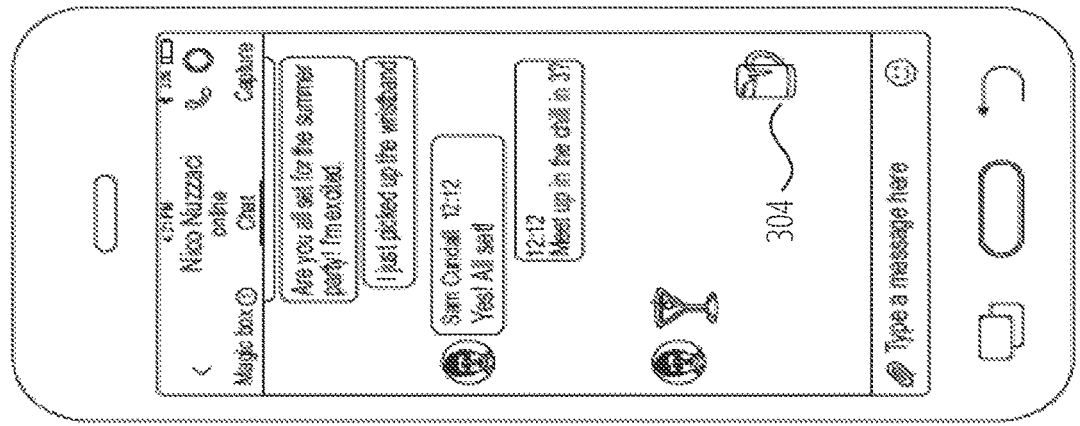
Figure 3C:
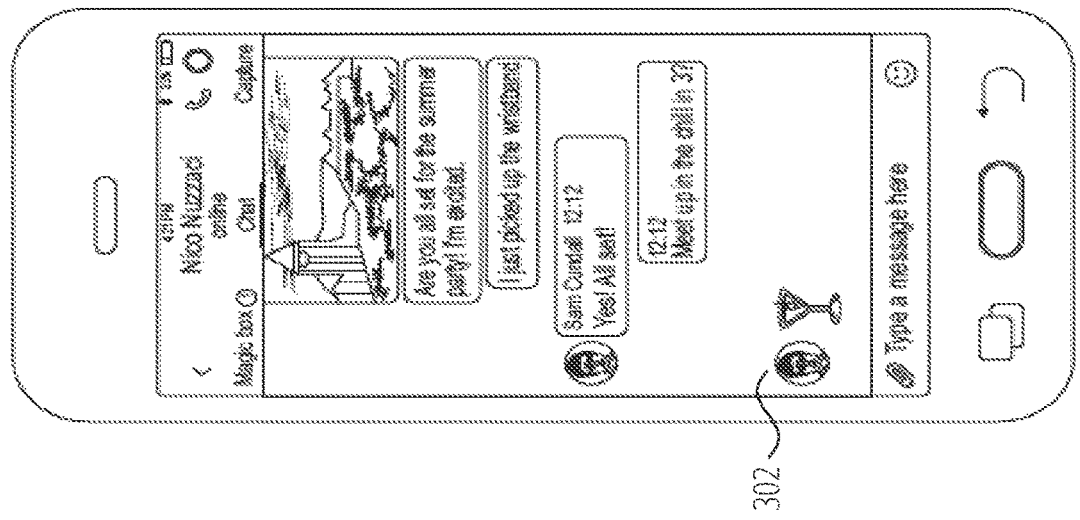

FIG. 3A-3C illustrates a view of a second example user interface for combining data in a communication stream in accordance with some embodiments. User device 300 includes a second example view of a communication platform (e.g., chat window) and may be an extension of user interface 200. Similar to the interaction in FIGS. 2A-2C, a user of user device 300 receives a message 302, an emoji of a martini glass. The communication engine server may determine a context of message 302 and message 304 to determine whether an animation is to be generated.

In response, at FIG. 3B, the user of user device 300 sends a message 304, an emoji of a beer mug. The communication engine server analyzes the messages and determines a context for each. The communication engine server may also analyze the content of preceding messages to better understand the context of message 302 and 304. Based on the content of the preceding text messages, the context of message 302 and message 304 indicates an adult beverage and a social interaction. Based on the context of the conversation (e.g., adult beverages, social interaction, cocktails, spirits, alcoholic beverages) of the sent/received emojis, the communication platform displays in FIG. 3C, an animation generated using the message 304 and message 306. In some embodiments the animation includes a corresponding audio clip of glasses clinking together.

Additional animation features may be included such as the emojis tilting backwards and liquid being drained from the emojis with a corresponding audio clip of drinking sounds. In some embodiments, the animation of message 304 and message 306 includes a corresponding additional or secondary animation. For example, message 304 and message 306 clink together and a background of the user interface changes colors, includes a confetti bursting animation, or other suitable additional/secondary animation.

Figure 4A:
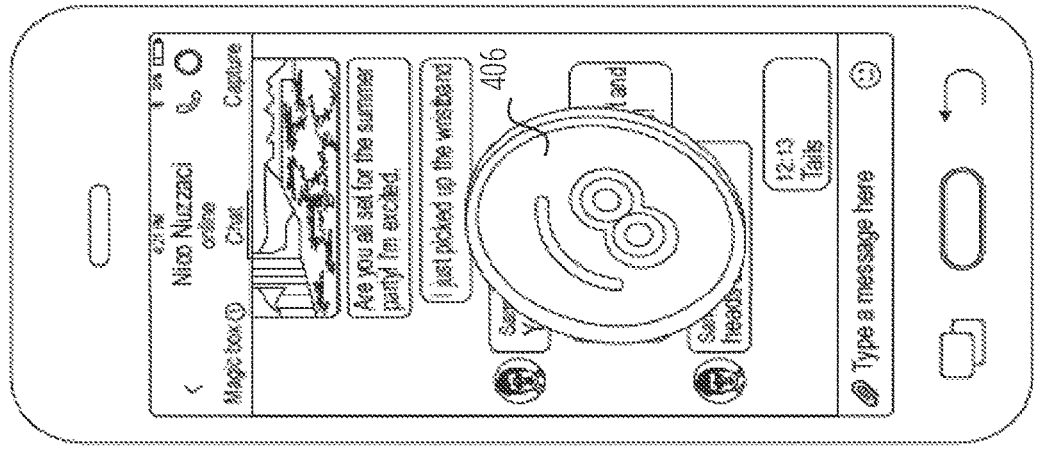
FIG. 4A-4E illustrates a view of a third example user interface application for combining data in a communication stream in accordance with some embodiments.
Figure 4B:
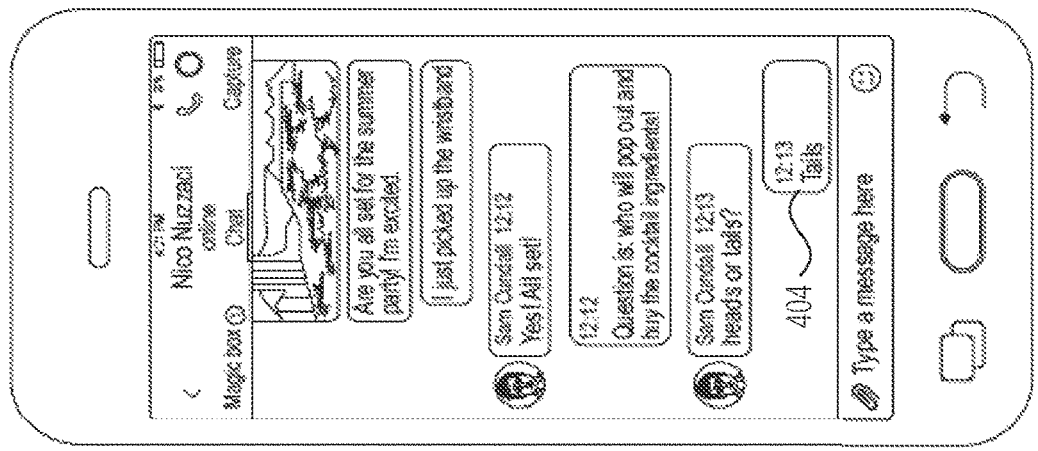

FIG. 4A-4E illustrates a view of a third example user interface for combining subsequent data in a communication stream in accordance with some embodiments. User device 400 includes a third example view of a communication platform (e.g., chat window) and may be an extension of user interface 200 and/or user interface 300. FIG. 4A displays a first text message 402 received from user "Sam Cundall" indicating "heads or tails?" In response at FIG. 4B, a second message 404 responds "tails." Based on the text and the context of the messages, the communication engine server 114 determines the conversation is attempting to use a random generator to determine an outcome.

Figure 4C:
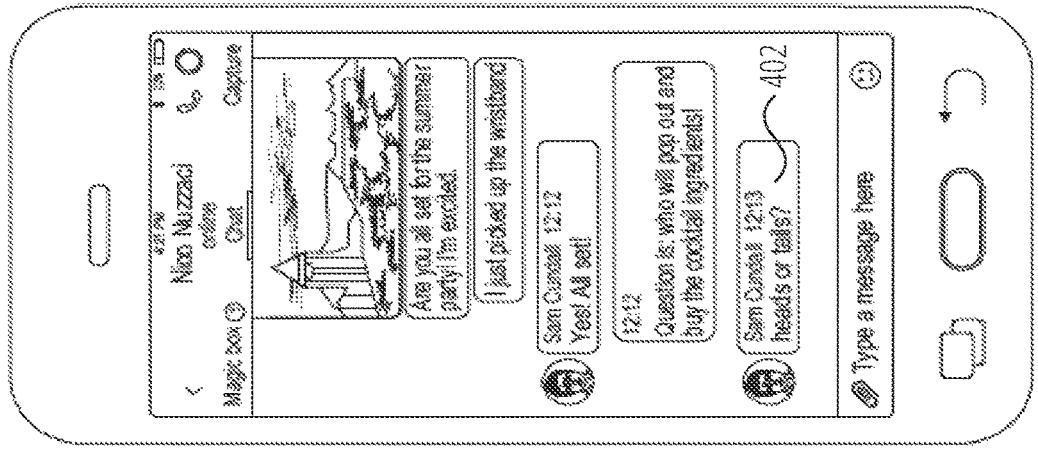
Figure 4D:
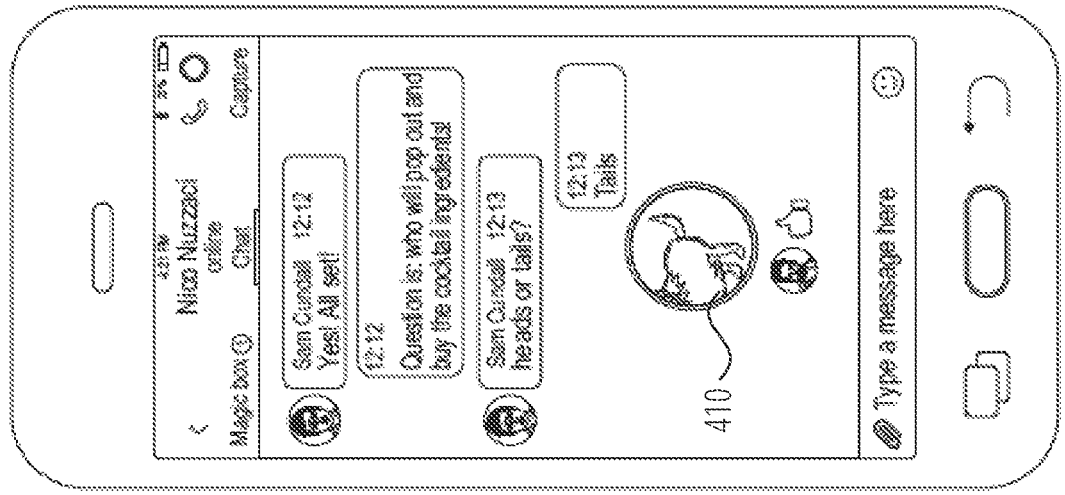
Figure 4E:
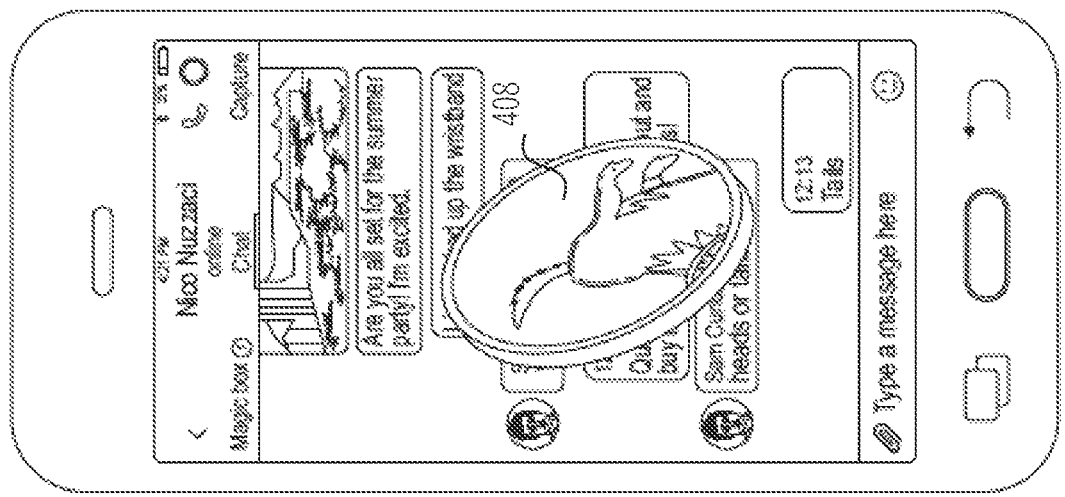

FIG. 4C displays a coin flip animation 406 that corresponds to the context of the conversation occurring on the communication platform. The animation continues at FIG. 4D as the coin flip animation 408 cycles between heads and tails. The resulting outcome of the coin flip animation 408 is displayed in FIG. 4E. The coin flip animation outcome 410 is displayed along with a profile picture and a thumbs up emoji of the user who called tails.

In some embodiments, the communication platform determines when to display an animation by cross-referencing a first and a second message in a communication stream with a predetermined table of animations. If the first and the second message fall within an animation category, the communication platform generates an animation using the first and second messages. For example, a fighting animation profile is a template for generating a fighting animation. The communication platform identifies a first message as an angry face emoji and a second message as a punching emoji. The first and second messages match the template for the fighting animation profile and a corresponding fighting animation is displayed using the angry face emoji and punching emoji.

In some other embodiments, the first and second messages are compared to a table of prespecified animations. The table includes a column for messages from participant A and another column for messages from participant B. Animations of varying types are identified for the various combinations of messages from participant A and participant B. The generated animation is the resulting combination of messages from participant A and participant B.

In another example, three users are in a group chat on a communication platform and wish to decide who in the group chat will pick a restaurant to dine at. The conversation includes key words such as "you pick" and "rock, paper, scissors" or corresponding emojis for rock, paper, and scissors. User 1 sends a message of a rock, user 2 sends a message of scissors, and user 3 sends a message of scissors. The communication engine server 114 determines that the group chat is attempting to determine a random outcome and provides an animation of a rock, paper, scissors battle. The messages of each user's selected move is not shown after each user has indicated their respective move and the resulting winner of the rock, paper, scissors battle is displayed for view to each user.

Figure 5:
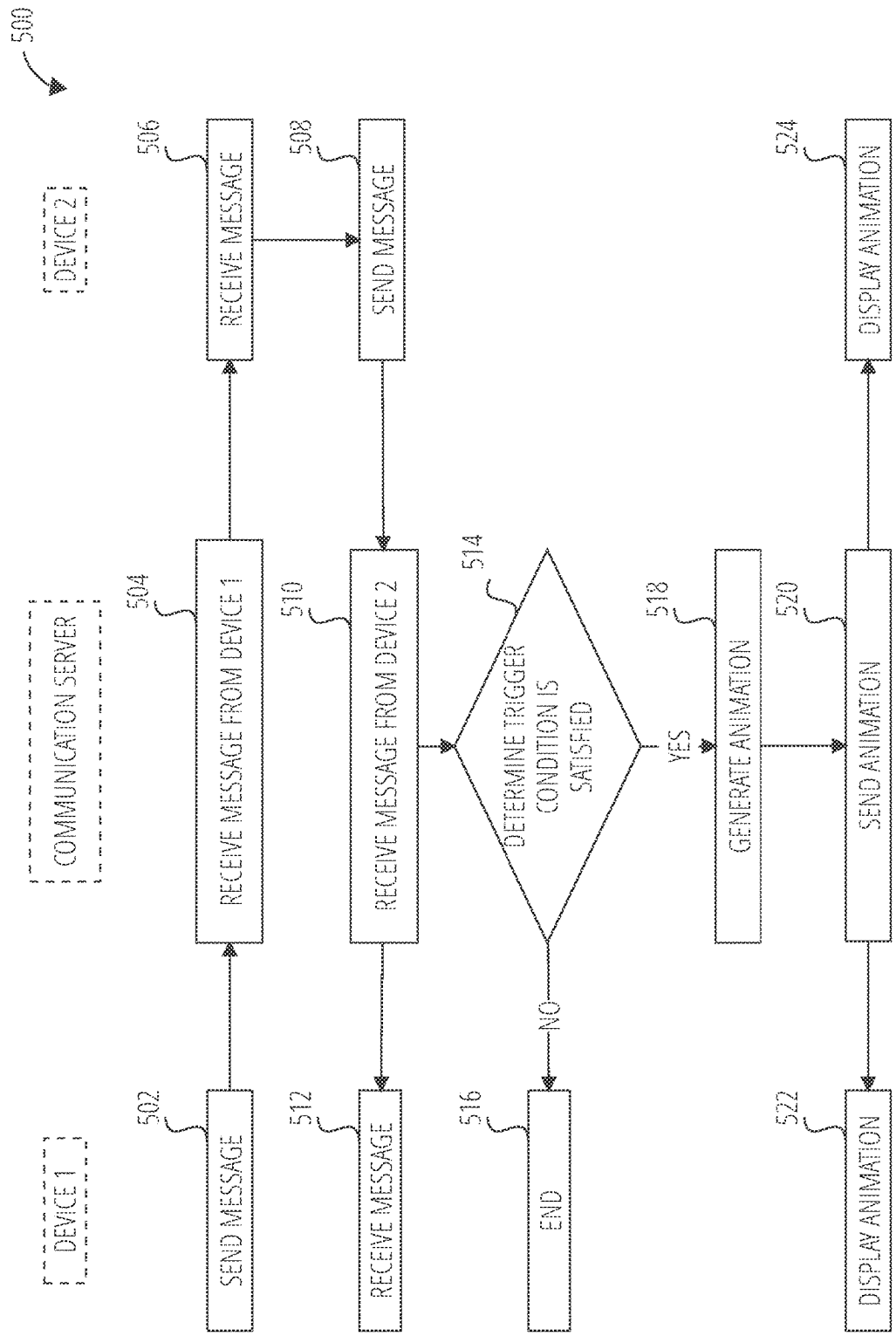
FIG. 5 illustrates a swim-lane flow diagram for combining data in a communication stream to generate an animation in accordance with some embodiments.

FIG. 5 illustrates a swim-lane flow diagram for combining subsequent data in a communication stream in accordance with some embodiments. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 500 begins at operation 502, a user of device 1 sends a message to device 2. The communication server receives the message from device 1 at operation 504. The communication server may be configured to forward, or send the message from device 1 to device 2. At operation 506, device 2 receives the message from device 1.

In response to the received message from device 1, device 2 at operation 508 sends a message back to device 1. The message from device 2 is received by the communication server at operation 510 to be forwarded to device 1. Device 1 receives the message from device 2 at operation 512. At operation 514, the communication server determines whether a trigger condition is satisfied. The trigger condition may be determined by both the first and second messages, or just one of the first or second message. In some embodiments, if the trigger condition is not satisfied, the communication server rests where the method ends at operation 516.

In some embodiments, the trigger condition may include the communication server performing a string search/string matching to determine if either or both of the messages include one or more predefined terms. In some embodiments where the message is an image message, determining the trigger condition has been satisfied includes determining that an image category of the image message matches.

For example purposes, the following matches trigger an animation:

A first emoji of a beer and a second emoji of a beer or similar drink trigger a cheers animation.

A first emoji of an angry face and a second emoji of an angry face or similar angry emotion icon triggers an animation of two emojis sparring.

A first emoji of a hand and a second emoji of a hand triggers a high-five animation.

A first emoji of a kissy face emoji and a second emoji of a kissy face emoji triggers an animation of two emojis kissing.

A first emoji of a monkey and a second emoji of a monkey triggers an animation of two monkeys holding hands and dancing.

If the communication server determines the trigger condition is satisfied, the communication server generates an animation at operation 518. The generated animation is sent by the communication server at operation 520 to both device 1 and device 2 at operations 522 and 524, respectively. In some examples, the animation may be created using the actual images sent. For example, an animation template may have the actual images substituted into the animation to produce the final animation. Thus, a first emoji of a drink glass and a second emoji of a drink glass triggers a cheers animation where the glasses "clink" together. The glasses may not be exactly the same emoji but may be different emojis of a same type. For example, a beer glass emoji and a martini glass emoji may produce an animation of a beer glass clinking a martini glass.

In some embodiments, a predefined list of emojis and animations are consulted to determine whether an animation is sent at operation 520. For example, a matching table is stored that includes a first message criteria and a second message criteria. If a received first message falls within the first message criteria and the responsive second message falls within the second message criteria, a predefined animation is selected and sent to the devices. In some embodiments, the first message and the second message are sent back to back (without any intervening messages). In some embodiments, there are other messages between the first and second message. For example, a user sends a first emoji of a beer mug and three intervening text messages later, a second user sends an emoji of a wine glass. Although there were three intervening text messages between the beer mug and the wine glass, the communication server may generate the toasting animation between the beer mug and the wine glass. In some embodiments, the number of acceptable intervening messages before generating the animation can be configured by a user, an administrator, or a programmer. In other embodiments, when there are intervening messages between the first and second messages, or when the contexts of the conversations are not satisfied, the animation is not generated. For example, if a first user types a message "I love you," the system may determine an affectionate context. If a second user in the conversation responds with a frowning face emoji, the system may search for a rule for message contexts with affection and sadness. If there is no rule for affection and sadness contexts, no animation may be generated. Likewise, if a first user types a message "I love you," and the second user types "I love you too," but the second user's message is not within a specified number of messages of the first user's "I love you," the system may not generate an animation.

In addition, contexts may be determined based upon more than one message. That is, a context may be determined over the course of several messages sent by the user. For example, the system may keep a current context of the conversation based upon messages from the users. If the current context satisfies a condition specified in a rule, the system may display an animation. Contexts may be determined for a whole conversation, for one or more messages of the conversation, for one or more users (based upon one or more of that user's messages), and the like.

If a predefined list of emojis includes a first message being a beer mug and a second message being a martini, an animation of a beer mug and martini glass is sent to the devices. In another example, if a first received message includes text saying "excited" and a second receive message is an emoji of a monkey, an animation of two monkeys holding hands and dancing is sent to the devices.

The operations of method 500 may be repeated for multiple messages between device 1 and device 2 and also may be scaled to include multiple more devices (e.g., for group messages of up to n devices).

Figure 6:
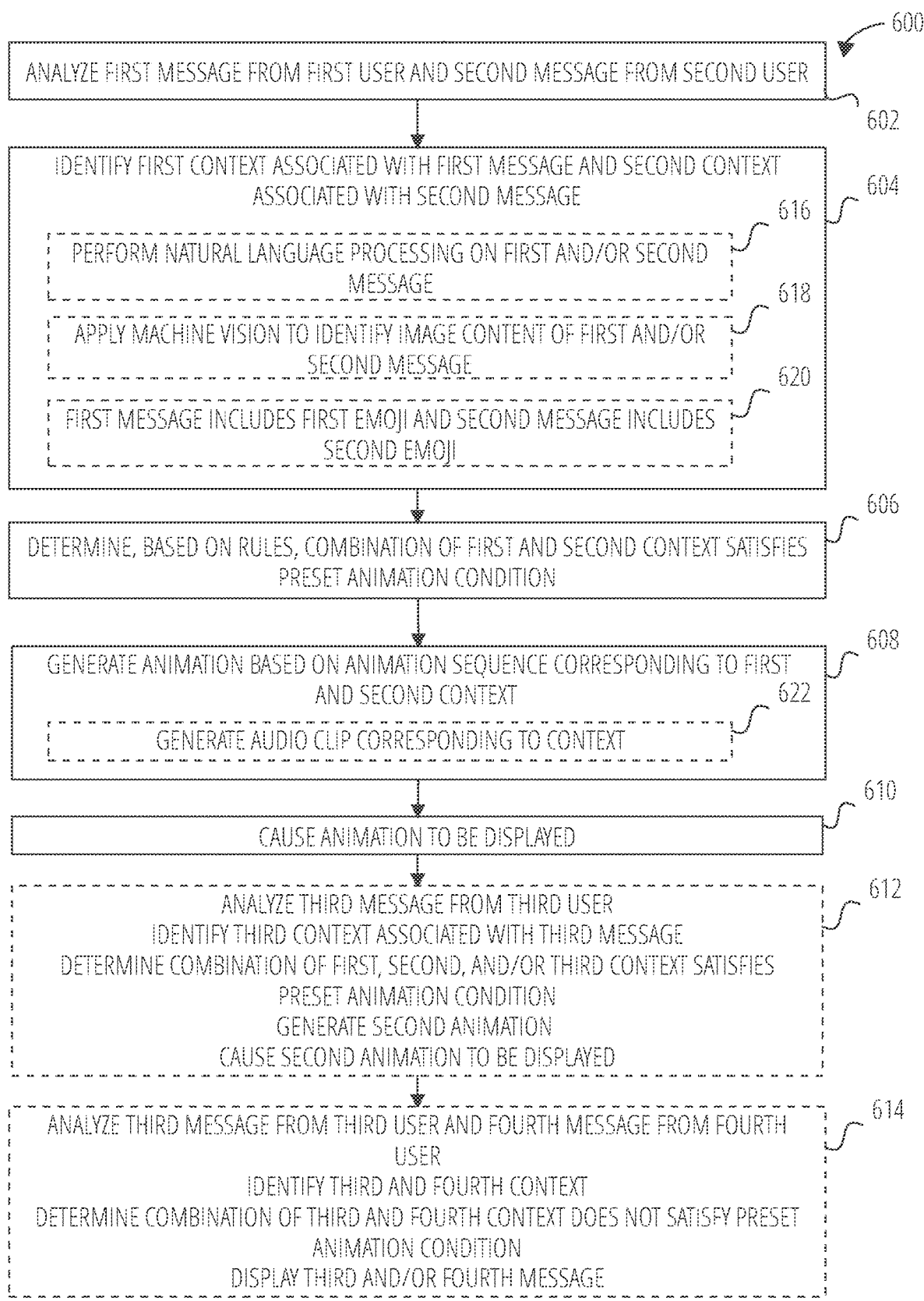
FIG. 6 illustrates a method for combining data in a communication stream to generate an animation in accordance with some embodiments.

FIG. 6 illustrates a method 600 for combining data in a communication stream in accordance with some embodiments. Method 600 is similar to method 500 and can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 600 includes similar operations to method 500 and may provide further details on the operations for combining data in a communication stream in accordance with some embodiments.

Method 600 begins at operation 602 where a computing device (e.g., communication server) analyzes a first message from a first user and a second message from a second user. The first message and the second message are both associated with a same conversation group. The first message may include an image, text, audio, and/or animation. The second message may also include an image, text, audio, and/or animation.

The computing device at operation 604 identifies, based on the analysis of operation 602, a first context associated with the first message and a second context associated with the second message. The context refers to what the first and second messages include based on the content of the message as well as any other messages within the conversation. For example, the first message is an emoji. The context describes what the emoji represents, not necessarily what it is. A kissing face emoji may represent love and affection as its "context." In some embodiments, at operation 616, identifying the first and second context may include performing natural language processing techniques on the first and/or second message. Similarly, in some other embodiments, at operation 618, identifying the context may include applying one or more machine vision techniques to identify image content of the first and/or second message. In some embodiments, the first message includes a first emoji and the second message includes a second emoji (operation 620).

In some embodiments, the computing device determines at operation 606, based on one or more rules, a combination of the first context and the second context satisfies a preset animation condition that an animation is to be displayed. The rules identify an animation sequence corresponding to the first and second context.

As described with respect to FIG. 5, various animations are generated based on triggers or otherwise described herein as rules. The rules are used to determine when the context of the first message and the context of the second message trigger the generation of an animation. The one or more rules are used to determine whether the identified context of the message(s) satisfy a preset animation condition. For example, rule 1 determines that a first context is a happy message and the second context is a celebration message, an animation will be generated (e.g., satisfies a preset animation condition). The preset animation condition may determine that the generated animation uses the content of the first and second messages to generate a confetti explosion animation.

In some embodiments, the one or more rules determine whether both the first and second messages are emoji messages. In some embodiments, the one or more rules determine that the first and second context does not satisfy a preset animation condition and an animation is not generated. In scenarios where an animation is not generated, the computing device may continue to perform the steps of method 600 until a determination that a combination of messages satisfies the preset animation condition and generates the animation.

In some embodiments, determining the one or more rules are used to determine that the first message and the second message are both emojis. In some embodiments, the trigger condition includes identifying the first message is an image of a predetermined type (e.g., emoji) and determining the triggering condition is met includes determining the image of the predetermined type includes an associated action (e.g., to generate an animation).

In some embodiments, the one or more rules determine the combination of the first and second context satisfies the preset animation condition when the first message includes a trigger word and the second message includes a second trigger word. For example, a user sends a message saying "Cheers!" (the first trigger word) and another user replies "Kanpai" (the second trigger word). The computing device recognizes that both messages are celebratory. In some embodiments, a match between the first context and the second context is used to determine whether an animation is to be generated. For example, a first context is determined to be of a happy emotion and a second context is determined to be of an excited emotion. When the one or more rules does not specify that the union, or combination, of the first context (e.g., happy emotion) and the second context (e.g., excited emotion) satisfies the preset animation condition, no animation is generated. In some embodiments, a machine learning model is trained to detect and determine whether messages in a conversation group fulfill trigger conditions to generate an animation for display.

At operation 608, the computing device generates an animation based on the animation sequence and content from at least one of the first message and the second message.

In some embodiments, generating the animation includes generating an animation based on an image in the first message and including at least a portion of the first image in the generated animation. For example, as shown in FIG. 2A, the first image of the first message (kissing emoji) is generated into an animation that includes two kissing emojis kissing each other. In some embodiments, a corresponding audio clip may be generated (operation 622) and combined with the animation. The generated kissing emoji animation may include a corresponding kissing audio clip.

In some embodiments, the animation instructions correspond to an animation that traverses a display screen of the first and second devices. In some embodiments, the animation instructions correspond to an animation that is removed from display of the chat at the first and second devices after a predefined time period. In some embodiments, the animation instructions correspond to an animation that persists on the display of the chat at the first and second devices.

After the animation is generated, the animation is caused to be displayed (operation 610). The generated animation may be displayed within the conversation group at various client devices. For example, a first and a second user of a conversation group are sending messages. Based on the methods and systems described herein, an animation is generated. The generated animation is caused to be displayed or otherwise provided for display to the first and second user of the conversation group. In some embodiments there exist more than two users in a conversation group and each user of the conversation group receives the animation to be displayed.

In some embodiments, at operation 612, the computing device analyzes a third message from a third user and identifies context associated with the third message. The computing device may then determine that the first, second and/or third context (or any combination of the first, second, and/or third contexts) satisfies a preset animation condition for generating a second animation. The second animation is generated and caused to be displayed to the first, second, and/or third user.

In some embodiments, at operation 614, the computing device analyzes a fourth message from a fourth user and determines that the third and the fourth contexts do not satisfy a preset animation condition. The third and fourth messages does not generate an animation and the third and fourth messages are displayed. In some embodiments, the third and fourth messages are caused to be displayed to each user of the conversation group.

For example, a third context indicates the third message is an angry message and a fourth context indicates the fourth message is an apologetic message. The one or more rules may indicate that the contexts do not satisfy any present animation conditions for generating an animation. In other examples, the third and fourth contexts may not trigger any of the one or more rules (e.g., the contexts are not within a predefined selection criteria of the one or more rules).

Generating Composite Images for Display

Figure 7A:
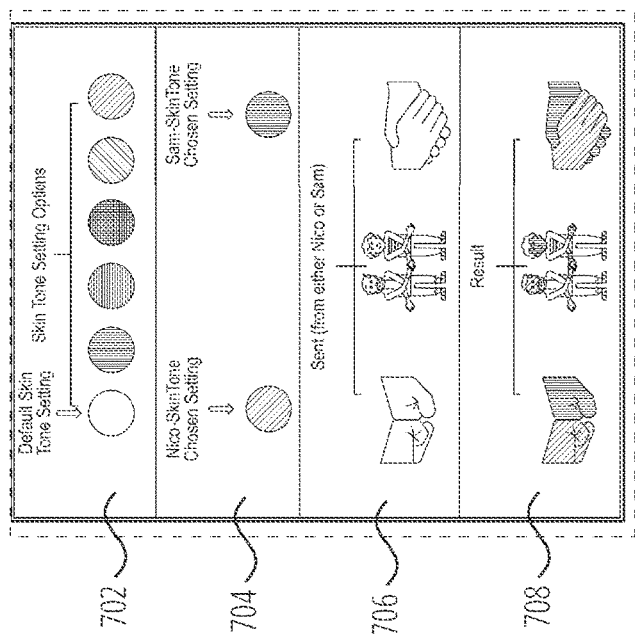
FIG. 7A-7B illustrates a first and second example synthesized image in accordance with some embodiments.

FIG. 7A illustrates a diagram for generating a composite image for display in accordance with some embodiments. Communication platforms include built-in emoji libraries that are semi-customizable. In some embodiments, various color configurations can be selected by the user and emojis may be updated if the emoji meets a criterion for composite modifications. A composite image is an edited or updated version of a baseline image based on one or more criteria. In one embodiment, a composite image is generated by modifying a baseline image by applying settings of attributes from more than one sources to the baseline image. Step 702 illustrates a spectrum of available and selectable skin tone settings options. A default skin tone setting is available for users who do not choose to personalize the built-in emojis using one of the selectable skin tone settings. Step 704 shows that a user (e.g., Nico) has selected a first skin tone option and a second user (e.g., Sam) has selected a second skin tone option. Step 706 shows when the first user or the second user sends an emoji that meets a criterion for composite modification from the emoji library, at step 708, the displayed emoji is a personalized, or composite emoji including the selected skin tone settings of the first and the second user. In some embodiments, when a first user has selected a skin tone setting and a second user has not, the displayed emoji at step 708 includes both the default skin tone setting and the selected skin tone setting of the first user. In some embodiments, emojis do not meet the composite modification criterion. For example, an emoji of an apple does not meet the composite modification criterion as user attributes are not typically used to modify the apple. Instead, in some examples, emojis depicting faces, people, and objects may be eligible for modification.

In some embodiments, a user attribute setting (e.g., skin tone) associated with a first user from a stored profile data structure of the first user and/or a user attribute setting associated with a second user from a second profile data structure of the second user are used to generate a composite image or animation for display. For example, similar to the animations generated and described in FIG. 2A-2C, user attribute settings may be applied to the generated animation. A skin tone of user 1 (e.g., Nico) may be applied to the kissing emoji and another skin tone of user 2 (e.g., Sam) may be applied to the kissing emoji. Both of the kissing emojis having respective skin tones may be used as part of the kissing animation (see FIG. 2C).

Figure 7B:
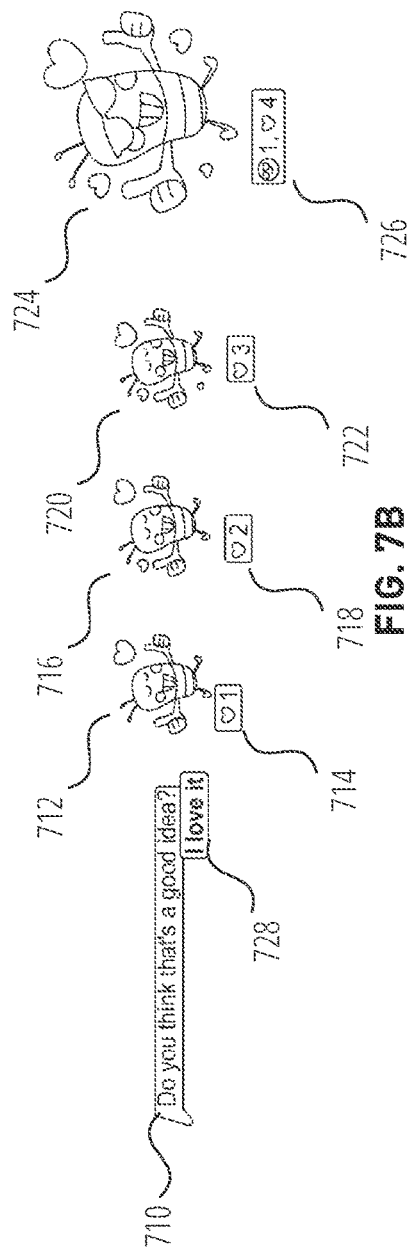

FIG. 7B is an illustration of a progression of generating a composite image for display in accordance with some embodiments. A communication platform may receive a message 710. In response to the specific message, a reaction message 728 may be received. Reaction message 728 may include text, images, videos, emojis, and other suitable response message types.

For example, in a group chat of multiple users (e.g., 6 users), a first user sends a message (e.g., message 710). In response to the first user's message, one or more of the other users of the group chat can respond using reactions (e.g., reaction message 728). The communication platform may display an image 712 corresponding to the first message (e.g., emoji). In some embodiments, the displayed image may be selected by a user within the group chat. The displayed image may receive reactions from the group chat. Based on the type and number of reactions received on the image, the image is updated. For example, image 712 has received one "love" reaction 714. Corresponding to the received "love" reaction, image 712 includes one heart. In some embodiments, the image 712 receives another "love" reaction, bringing the total number of "love" reactions to two. The image 716 reflects the number of "love" reactions and includes two hearts. In some embodiments, the image 716 receives yet another "love" reaction 722 and image 720 is updated to include three hearts. In some embodiments, image 720 receives two more reactions, a first reaction being a smiley face emoji wearing sunglasses and another "love" reaction. Image 724 is displayed with one sunglasses and four heart reactions 726. The size of the image may also grow as each reaction is received. In general, one or more properties of the image may change as reactions are received.

The updated emoji may be referred to herein as a composite image. In some embodiments, various other reactions are used to update an emoji/composite image. Additional reactions include but are not limited to love, smile, heart, hug, sunglass smiley, angry smiley face, heart break, thumbs up, thumbs down, exclamation points, and other emotional reactions.

Figure 8:
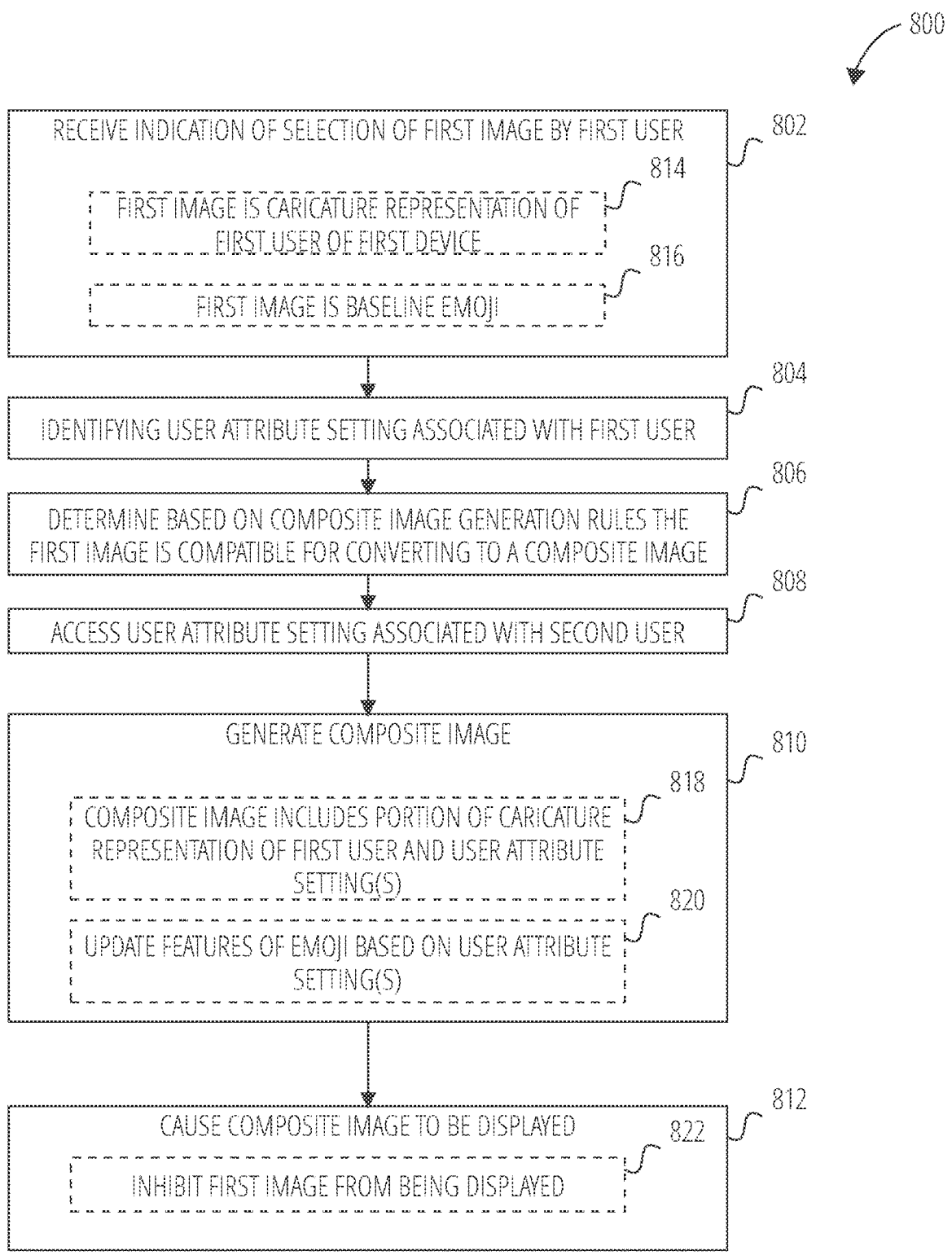
FIG. 8 illustrates a method for combining data in a communication stream to generate a synthesized image in accordance with some embodiments.

FIG. 8 illustrates a method 800 for generating a composite image by combining subsequent data or user properties in a communication stream in accordance with some embodiments. Method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 800 proceeds at operation 802, where a computing device receives an indication of a selection of a first image by a first user for transmission to a second user in a communication thread. In some embodiments, the first image is a caricature representation of the first user of the first device (operation 814). In some embodiments, the first image is a baseline emoji (operation 816). A baseline emoji may be an emoji selected from a menu of assorted, selectable emojis. The baseline emoji may be a generic emoji that is available for any user of the communication thread. In some embodiments, the selected first image is a baseline emoji that is not compatible for converting to a composite image. Various baseline emojis such as flags, numbers, objects, and locations may be predefined as being ineligible or incompatible for converting into a composite image or composite images. Various other baseline emojis such as smiley face emojis may be predefined as being eligible for conversion. In some embodiments, emojis and/or emoticons are separated into lists of emojis being compatible and incompatible for converting to a composite image. The first image selected by the first user may be compared against the list of compatible and incompatible emojis to determine if the first image is compatible for converting into a composite image. Additionally, it is understood that the first image may be an image or emoticon that is converted into a composite image or animation.

The computing device at operation 804 identifies a user attribute setting associated with the first user, second user, or both the first and second user from a stored profile data structure of the first user. For example, a first user maintains a user profile associated with the communication thread (e.g., Microsoft Teams chat). The user profile may include various user attributes settings including but not limited to a user's skin tone, hair color, eye color, or other feature selected by or selected for the user.

At operation 806, the computing device determines, based on composite image generation rules, that the selected first image is compatible for converting to a composite image. Following operation 806, the computing device accesses a user attribute setting associated with the first user, second user, or both from a stored profile data structure of the second user (operation 808).

The computing device generates the composite image at operation 810 based on the selected first image and the user attribute setting associated with the first user, second user, or both first and second users. In some embodiments, the generated composite image includes a portion of a caricature representation of the first user and at least one of a user attribute setting of the first and/or second user (operation 818). In some embodiments, the generated composite image is an updated first image based on user attribute settings of the first and/or the second user (operation 820).

After the composite image is generated, the computing device causes the composite image to be displayed (operation 812). In some embodiments, causing the composite image to be displayed includes inhibiting the first image from being displayed such that only the composite image is displayed (operation 822). The first image in some embodiments is selected by the first user but not displayed. The generated composite image is displayed instead of the first image. In some embodiments, the first image is displayed. After generation of the composite image, the first image may be transitioned (e.g., via animation) into the composite image. For example, an animation may cause the first image to morph into the composite image.

In some embodiments, the composite image is caused to be displayed on multiple devices for users in the communication thread. For example, if the first image is received from a chat conversation including a first, second, and third device, the generated composite image is sent to each of the first, second, and third devices.

In examples in which the conversation is between more than two users, the system may use properties of all users of the conversation, or properties of a sub-group of the conversation to both determine that a composite image should be created and to generate the composite image.

Figure 9:
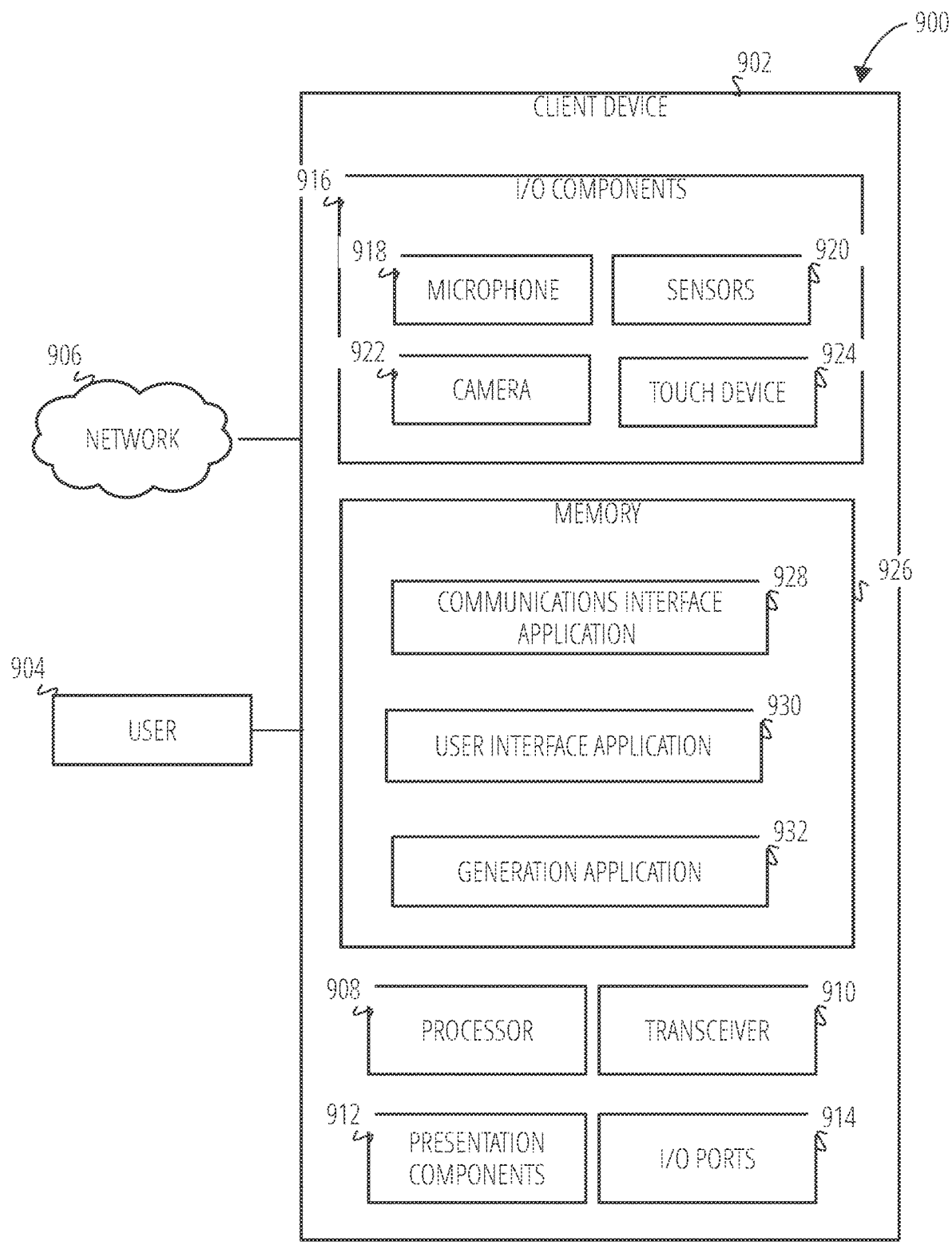
FIG. 9 is a block diagram of an example networked system depicting an environment in which embodiments may operate.

FIG. 9 depicts a block diagram that illustrates an example client device 902 for collecting and providing user and environment data. In some examples, the client device 902 has at least one processor 908, a transceiver 910, one or more presentation components 912, one or more input/output I/O ports 914, and a memory 926.

The client device 902 may take the form of a mobile computing device or any other portable device, such as, a mobile telephone, laptop, tablet, computing pad, notebook, gaming device, portable media player, etc. The client device 902 may also include less portable devices such as desktop personal computers, kiosks, tabletop devices, industrial control devices, etc. Other examples may incorporate the client device 902 as part of a multi-device system in which two separate physical devices share or otherwise provide access to the illustrated components of the computing device 902.

The processor 908 may include any quantity of processing units and is programmed to execute computer-executable instructions for implementing aspects of the disclosure. The instructions may be performed by the processor or by multiple processors within the computing device or performed by a processor external to the computing device. In some examples, the processor 908 is programmed to execute methods such as the one illustrated in accompanying FIGS. 5-6.

Additionally, or alternatively, some examples may make the processor 908 programmed to present an experience in a user interface ("UI"), e.g., the UI shown in FIGS. 2-4. Moreover, in some examples, the processor 908 may represent an implementation of techniques to perform the operations described herein.

The transceiver 910 is an antenna capable of transmitting and receiving radio frequency ("RF") signals. One skilled in the art will appreciate and understand that various antenna and corresponding chipsets may be used to provide communicative capabilities between the client device 902 and other remote devices. Examples are not limited to RF signaling, however, as various other communication modalities may alternatively be used.

The presentation components 912 visibly or audibly present information on the computing device 100. Examples of presentation components 912 include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user. In some examples, the client device 902 may be a smart phone or a mobile tablet that includes speakers capable of playing audible search results to the user. In other examples, the client device 902 is a computer in a car that audibly presents search responses through a car speaker system, visually presents search responses on display screens in the car, e.g., situated in the car's dashboard, within headrests, on a drop-down screen, or the like, or a combination thereof. Other examples may present the disclosed search responses through various other display or audio presentation components 912.

I/O ports 914 allow the client device 902 to be logically coupled to other devices and I/O components 914, some of which may be built into client device 902 while others may be external. Specific to the examples discussed herein, I/O components 914 include a microphone 918, one or more sensors 920, a camera 922, and a touch device 924. The microphone 918 captures speech from the user 902 and/or speech of or by the user 904. The sensors 920 may include any number of sensors on or in a mobile computing device, electronic toy, gaming console, wearable device, television, vehicle, or other computing device 902. Additionally, the sensors 920 may include an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user 702 or the environment. The camera 722 captures images or video of the user 904. The touch device 724 may include a touchpad, track pad, touch screen, or other touch-capturing device. The illustrated I/O components 914 are but one example of I/O components that may be included on the client device 100. Other examples may include additional or alternative I/O components 914, e.g., a sound card, a vibrating device, a scanner, a printer, a wireless communication module, or any other component for capturing information related to the user or the user's environment.

Figure 10:
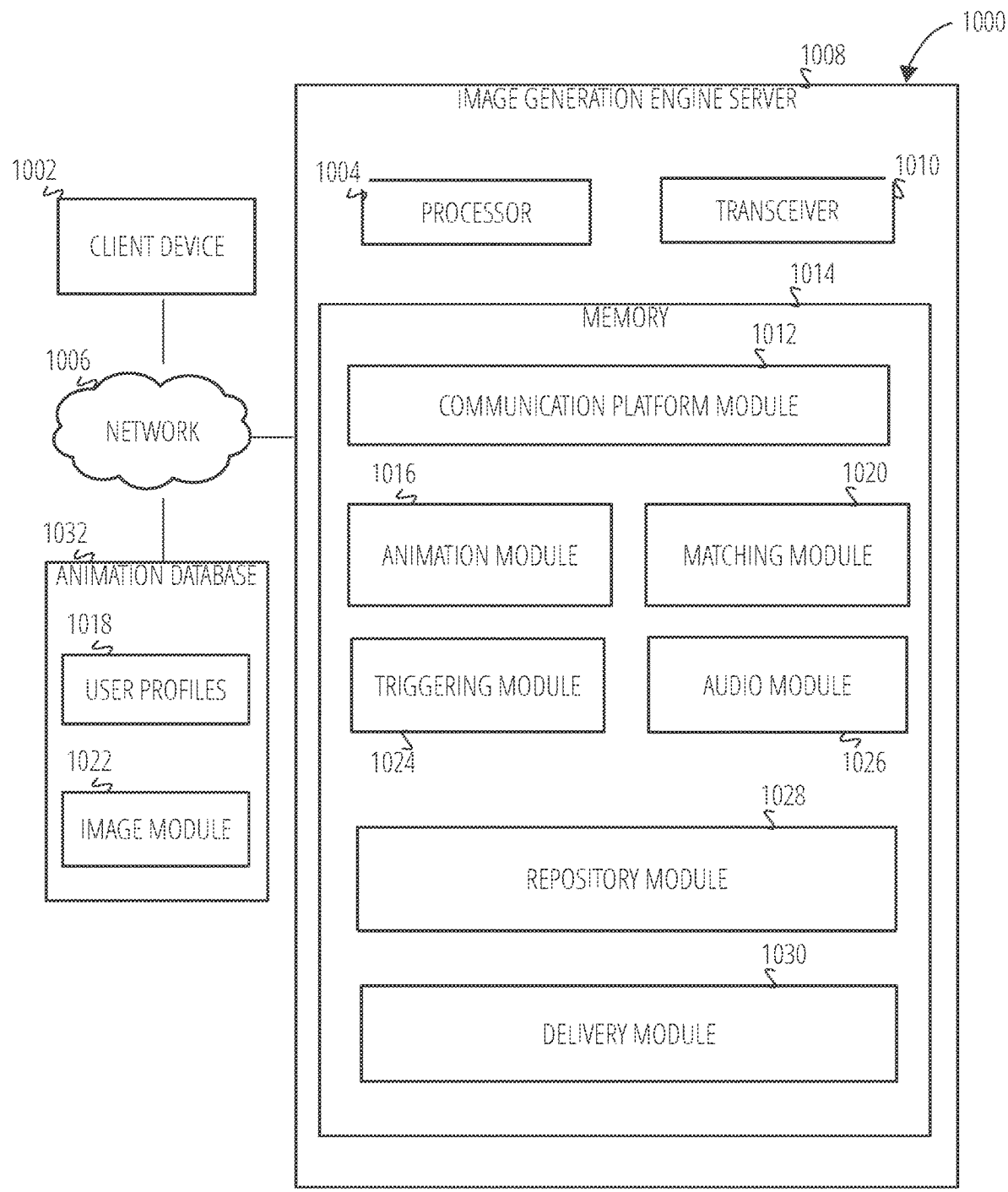
FIG. 10 is a block diagram of a computer system to implement one or more example embodiments.

The memory 926 includes any quantity of memory associated with or accessible by the computing device 902. The memory 926 may be internal to the client device 902, as shown in FIG. 10, external to the client device 100, not shown in FIG. 4, or both. Examples of memory 926 may include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the client device 902. The terms computer-readable medium, machine readable medium, and storage device do not include carrier waves to the extent carrier waves are deemed too transitory. Memory 926 may also take the form of volatile and/or nonvolatile memory; may be removable, non-removable, or a combination thereof; and may include various hardware devices, e.g., solid-state memory, hard drives, optical-disc drives, etc. Additionally, or alternatively, the memory 926 may be distributed across multiple client devices 902, e.g., in a virtualized environment in which instruction processing is carried out on multiple client devices 902. The memory 926 stores, among other data, various device applications that, when executed by the processor 908, operate to perform functionality on the computing device 100. Examples of applications may include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 906. For example, the applications may include client-operating applications that correspond to server-side applications executing on remote servers or computing devices in the cloud.

Specifically, instructions stored in memory 926 comprise a communications interface application 928, a user interface application 930, and a streaming application 932. In some examples, the communications interface application 928 includes computer-executable instructions for operating a network interface card and/or a driver for operating the network interface card. Communication between the client device 902 and other devices may occur using any protocol or mechanism over a wired or wireless connection, or across the network 906. In some examples, the communications interface application 928 is operable with RF and short-range communication technologies using electronic tags, such as NFC tags, Bluetooth® brand tags, or the like.

In some examples, the user interface application 930 includes a graphics application for displaying data to the user and receiving data from the user. The user interface application 930 may also include computer-executable instructions for operating the graphics card to display search results and corresponding images or speech on or through the presentation components 912. The user interface application 930 may also interact with the various sensors 920 and camera 922 to both capture and present information through the presentation components 912.

FIG. 10 is a block diagram of a networking environment 1000 for providing image search results and recommendations on client device(s) 1002. The networking environment 1000 may include multiple client devices 1002, or just one as shown in FIG. 9, an image generation engine server 1008 communicating over a network 1006. In some examples, user and environment data are communicated by the client devices 1002 over the network 1006 to the image generation engine server 1008, and the image generation engine server 1008 provides or facilitates the generation of animations and/or composite images for users of client devices 1002.

The networking environment 1000 shown in FIG. 10 is merely an example of one suitable computing system environment and is not intended to suggest any limitation as to the scope of use or functionality of examples disclosed herein. Neither should the illustrated networking environment 1000 be interpreted as having any dependency or requirement related to any single component, module, index, or combination thereof.

The network 1006 may include any computer network, for example the Internet, a private network, local area network (LAN), wide area network (WAN), or the like. The network 1006 may include various network interfaces, adapters, modems, and other networking devices for communicatively connecting the client devices 1002 and the image generation engine server 1008. The network 1006 may also include configurations for point-to-point connections. Computer networks are well known to one skilled in the art, and therefore do not need to be discussed in detail herein.

The client device 1002 may be any type of client device discussed above in reference to FIG. 1. Each client device 1002 may capture user and/or environment data from their respective users and communicate the captured user and environment data over the network 1006 to the image generation engine server 1008. To do so, each device may be equipped with a communications interface application 928 as discussed above in reference to FIG. 9. In response, the image generation engine server 1008 may be capable of providing and receiving messages including images, videos, audio, text, and other various communication media to and from client device 1002 over the network 1006.

The client device 1002 may be equipped with various software applications and presentation components 912 for communicating via communication platform module 1012 for combining subsequent data in a communication stream. For example, a mobile phone may display a communication platform (e.g., Microsoft Teams application) for communicating with friends. The communication platform includes a feature that generates animations and/or composite images based on context of the communication. The illustrated client devices and the aforesaid presentation mechanisms are not an exhaustive list covering all examples. Many different variations of client devices 1002 and presentation techniques may be used to procure and integrate devices.

The image generation engine server 1008 represents a server or collection of servers configured to execute different web-service computer-executable instructions. The image generation engine server 1008 includes a processor 1004 to process executable instructions, a transceiver 1010 to communicate over the network 1006, and a memory 1014 embodied with at least the following executable instructions: a communication platform module 1012, animation module 1016, matching module 1020, triggering module 1024, and an audio module 1026. The memory 1014 may also include instructions for repository module 1028 and delivery module 1030. While the image generation engine server 1008 is illustrated as a single box, one skilled in the art will appreciate that the image generation engine server 1008 may, in fact, be scalable. For example, the image generation engine server 1008 may include multiple servers operating various portions of software that collectively generate animations and/or composite images for users of client devices (e.g., client device 1002).

The animation database 1032 provides backend storage of Web, user, and environment data that may be accessed over the network 1006 by the image generation engine server 1008 or the client device 1002 and used by the image generation engine server 1008 to combine subsequent data in a communication stream. The Web, user, and environment data stored in the database includes, for example but without limitation, user profiles 1018, image module 1022, and so on. image module 1022 may include historical logs of active, inactive, and pending devices along with faulty devices, devices out for repair, and other information related to devices within the network and/or organization associated with a user. Additionally, though not shown for the sake of clarity, the servers of the animation database 1032 may include their own processors, transceivers, and memory. Also, networking environment 1000 depicts the database 1032 as a collection of separate devices from the image generation engine server 1008 however, examples may actually store the discussed Web, user, and environment data shown in the animation database 1032 on the image generation engine server 1008.

Herein, a "user profile" refers to an electronically stored collection of information related to the user. Such information may be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile may be built through probing questions to the user or through analyzing the user's behavior on one or more client devices.

Additionally, user profiles 1018 may include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 1018 may be expanded to encompass various other aspects of a user's life.

The present disclosure relates to systems and methods for combining subsequent data in a data stream according to at least the examples provided in the sections below:

(A1) In one aspect, some embodiments or examples include a method performed at a client device (e.g., user device 102), in data communication with a network (e.g., network 906).

The method includes analyzing (e.g., operation 602) a first message from a first user and a second massage from a second user, where in the first message and the second message are associated with a same conversation group. Based on the analyzing, the method includes identifying (e.g., operation 604) a first context associated with the first message and a second context associated with the second message. The method includes determining (e.g., operation 606), based on one or more rules, that the first context and the second context satisfies a preset animation condition that an animation is to be displayed, the rules identifying an animation sequence corresponding to the first context and the second context. In some embodiments, the rules determine whether a threshold number of messages has been received and/or sent between the first message and the second message. If the threshold number of messages has been received, the rules may determine that the first and second messages do not satisfy the preset animation condition. For example, a first message is an emoji of a red, angry face. The second message may be an emoji of a sad face. There may be intervening messages received and sent between the first and second messages that exceed a threshold (e.g., 3 other messages). Based on the number of messages between the first and the second message, the context of the conversation may shift and the computing device may be configured to not generate an animation as the preset animation condition is not satisfied.

Responsive to determining that an animation is to be displayed, generating (e.g., operation 608) an animation based upon the animation sequence and content from at least one of the first message and the second message and causing (e.g., operation 610) the animation to be displayed.

(A2) In some embodiments of A1, where identifying the context comprises performing (e.g., operation 616) natural language processing on the first and/or second message (A3) In some embodiments of A1-A2, where identifying the context comprises applying (e.g., operation 618) one or more machine vision techniques to identify image content of the first and/or second message.

(A4) In some embodiments of A1-A3, where the first message includes a first emoji and the second message includes a second emoji (e.g., operation 620); and the first context is determined based on a type of the first emoji and the second context is determined based on a type of the second emoji.

(A5) In some embodiments of A1-A4, where the animation includes the first emoji and the second emoji (see FIG. 2C).

(A6) In some embodiments of A1-A5, where the animation sequence includes instructions to generate an audio clip (e.g., operation 622) corresponding to the context.

(A7) In some embodiments of A1-A6, the method includes analyzing (e.g., operation 612) a third message from a third user, wherein the third message is associated with the same conversation group as the first message and the second message. Based on the analyzing, identifying a third context associated with the third message and determining, based upon one or more rules, that the first context, the second context, and the third context satisfies a preset animation condition that a second animation is to be displayed. Responsive to determining that a second animation is to be displayed, generating a second animation based upon the animation sequence and content from at least one of the first message, the second message, and the third message and causing the second animation to be displayed.

(A8) In some embodiments of A1-A7, the method includes analyzing (e.g., operation 614) a third message from a third user and a fourth massage from a fourth user, where in the third message and the fourth message are associated with the same conversation group. Based on the analyzing, identifying a third context associated with the third message and a fourth context associated with the fourth message and determining, based upon one or more rules, that the third context and the fourth context does not satisfy a preset animation condition that an animation is to be displayed, and causing the third message and the fourth message to be displayed.

(B1) In one aspect, some embodiments or examples include a method performed at a client device (e.g., user device 102), in data communication with a network (e.g., network 906).

The method includes: receiving (e.g., operation 802) an indication of a selection of a first image by a first user for transmission to a second user in a communication thread, identifying (e.g., operation 804) a user attribute setting associated with the first user from a stored profile data structure of the first user, determining (e.g., operation 806), based upon one or more composite image generation rules, that the selected first image is compatible for converting to a composite image. In accordance with the determination that the selected first image is compatible for converting, accessing (e.g., operation 808) a user attribute setting associated with the second user from a stored profile data structure of the second user and generating (e.g., operation 810) the composite image based on the selected first image, the user attribute setting associated with the first user, and the user attribute setting associated with the second user, and causing (e.g., operation 812) the composite image to be displayed in the communication thread.

(B2) In some embodiments of B1, the selected first image is a baseline emoji (e.g., operation 816) and generating the composite image comprises modifying (e.g., operation 820) one or more baseline attributes of the baseline emoji with the user attribute settings associated with the first user and the user attribute setting associated with the second user.

(B3) In some embodiments of B1-B2, the method includes receiving an indication of a selection of a second image by the first user for transmission to the second user in the communication thread, determining, based upon the one or more composite image generation rules, that the selected second image is not compatible for converting to a composite image. In accordance with the determination that the selected first image is not compatible for converting, causing the second image to be displayed in the communication thread.

(B4) In some embodiments of B1-B3, causing the composite image to be displayed in the communication thread comprises inhibiting (e.g., operation 822) the first image from being displayed in the communication thread.

(B5) In some embodiments of B1-B4, causing the composite image to be displayed in the communication thread further comprises causing display of the first image in the communication thread, removing the first image from display in the communication thread, and replacing the composite image in place of the first image for display.

(B6) In some embodiments of B1-B5, the first image is a caricature representation (e.g., operation 814) of the user, and the composite image includes at least a portion of the caricature representation of the user and the user attribute setting.

(B7) In some embodiments of B1-B6, generating the composite image includes including at least a portion of a caricature representation of a second user in the communication thread.

(B8) In some embodiments of B1-B7, the one or more composite image generation rules are used to determine whether the first image is a dynamic emoji or a static emoji.

(B9) In some embodiments of B1-B8, the dynamic emoji includes baseline attributes compatible for updating the dynamic emoji using the user attribute setting.

(B10) In some embodiments of B1-B9, the composite image includes an animation effect to be displayed in the communication thread.

In yet another aspect, a system, comprising: a processor; and a memory device coupled to the processor and having a program stored thereon for execution by the processor to perform operations comprising any of the methods of A1-A8 and B1-B10 described above.

In yet another aspect, some embodiments include a non-transitory computer-readable storage medium storing one or more programs for execution by one or more processors of a storage device, the one or more programs including instructions for performing any of the methods described herein (e.g., A1-A8 and B1-B10 described above).

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

What is claimed is:

1. A computer system for displaying an image in a communication thread, the system comprising:
   one or more processors; and
   a memory storing computer-executable instructions that, when executed, cause the one or more processors to control the system to perform operations of:
      receiving, via a user interface, a selection of a first image by a first user for display in the communication thread, wherein the communication thread is accessible to the first user and a second user;
      analyzing user attribute settings of the first user or the second user to determine if at least one of the first user or the second user has a user attribute setting corresponding to a customizable aspect of the selected first image; and causing, based on the analyzing, one of the selected first image or a modified image based on the selected first image to be displayed in the communication thread in two display modes, including:

a first mode: if the user attribute settings do not correspond to the customizable aspect of the selected first image, causing the selected first image to be displayed in the communication thread; and a second mode: if one or more of the user attribute settings correspond to the customizable aspect of the selected first image, generating the modified image based on the selected first image according to the one or more user attribute settings and causing the generated modified image to be displayed in the communication thread.

2. The computer system of claim 1, wherein the operations comprise:

determining if the selected first image is compatible for converting to the modified image; and causing, based on the determining, one of the analyzing the user attribute settings of the first user or the second user to determine if at least one of the first user or the second user has a user attribute setting corresponding to the customizable aspect of the selected first image or the selected first image to be displayed in the communication thread, comprising:

if the selected first image is determined as not compatible for converting to the modified image, causing the selected first image to be displayed in the communication thread; and if the selected first image is determined as compatible for converting to the modified image, analyzing the user attribute settings of the first user or the second user to determine if at least one of the first user or the second user has the user attribute setting corresponding to the customizable aspect of the selected first image.

3. The computer system of claim 1, wherein the operations comprise:

determining if the selected first image comprises a customizable aspect; and causing, based on the determining, one of the analyzing the user attribute settings of the first user or the second user to determine if at least one of the first user or the second user has a user attribute setting corresponding to the customizable aspect of the selected first image or the selected first image to be displayed in the communication thread, comprising:

if the selected first image does not comprise the customizable aspect, causing the selected first image to be displayed in the communication thread; and if the selected first image comprises the customizable aspect, analyzing the user attribute settings of the first user or the second user to determine if at least one of the first user or the second user has a user attribute setting corresponding to the customizable aspect of the selected first image.

4. The computer system of claim 1, wherein generating the modified image based on the selected first image according to the one or more user attribute settings and causing the generated modified image to be displayed in the communication thread comprises:

identifying a location of the customizable aspect of the selected first image corresponding to the user attribute settings of the first user or the second user; and applying one of the user attribute settings of the first user or the second user to the location of the customizable aspect of the selected first image.

5. The computer system of claim 1, wherein determining if the selected first image is compatible for converting to the modified image includes determining if the selected first image has aspects of multiple users.

6. The computer system of claim 1, wherein the communication thread includes a message between the first user and the second user or a message viewable by multiple users including the first user and the second user.

7. The computer system of claim 1, wherein the user attribute settings include settings stored in a profile data structure.

8. The computer system of claim 1, wherein analyzing user attribute settings of the first user or the second user comprises analyzing attribute settings of the first user and the second user to determine if at least one of the first user or the second user has one or more user attribute settings corresponding to one or more customizable aspects of the selected first image.

9. The computer system of claim 1, wherein analyzing user attribute settings of the first user or the second user comprise analyzing user attribute settings of the first user and the second user to determine if both of the first user and the second user have one or more user attribute settings corresponding to one or more customizable aspects of the selected first image, wherein causing one of the selected first image or the modified image to be displayed in the communication thread includes:

if the user attribute settings of both of the first user and the second user do not correspond to the one or more customizable aspects of the selected first image, causing the selected first image to be displayed in the communication thread; and if the user attribute settings of both of the first user and the second user correspond to the one or more customizable aspects of the selected first image, generating the modified image based on the selected first image according to the user attribute settings and causing the generated modified image to be displayed in the communication thread.

10. The computer system of claim 1, wherein the modified image includes an animation effect to be displayed in the communication thread.

11. The computer system of claim 1, wherein causing the generated modified image to be displayed in the communication thread comprises removing the first image from display in the communication thread and replacing the first image with the modified image.

12. The computer system of claim 1, wherein causing the generated modified image to be displayed in the communication thread comprises inhibiting the first image from being displayed in the communication thread.

13. The computer system of claim 1, wherein the selected first image is an unmodified baseline emoji having one or more baseline attributes attributable to multiple users.

14. The computer system of claim 1, wherein generating the modified image based on the selected first image according to the one or more user attribute settings comprises modifying one or more attributes of the selected first image to match corresponding user attribute settings of the first user or the second user.

15. A computer-implemented method for displaying an image in a communication thread, the method comprising:
receiving, via a user interface, a selection of a first image by a first user for display in the communication thread, wherein the communication thread is accessible to the first user and a second user;
analyzing user attribute settings of the first user or the second user to determine if at least one of the first user or the second user has a user attribute setting corresponding to a customizable aspect of the selected first image; and
causing, based on the analyzing, one of the selected first image or a modified image based on the selected first image to be displayed in the communication thread in two display modes, including:
a first mode: if the user attribute settings do not correspond to the customizable aspect of the selected first image, causing the selected first image to be displayed in the communication thread; and
a second mode: if one or more of the user attribute settings correspond to the customizable aspect of the selected first image, generating the modified image based on the selected first image according to the one or more user attribute settings and causing the generated modified image to be displayed in the communication thread.

16. The method of claim 15, wherein analyzing user attribute settings of the first user or the second user comprises analyzing user attribute settings of the first user and the second user to determine if at least one of the first user or the second user has one or more user attribute settings corresponding to one or more customizable aspects of the selected first image.

17. A computer system for displaying an image in a communication thread, the system comprising:
one or more processors; and
a memory storing computer-executable instructions that, when executed, cause the one or more processors to control the system to perform operations of:
receiving, via a user interface, a selection of a first image by a first user for display in the communication thread, wherein the communication thread is accessible the first user and a second user;
determining if the selected first image is compatible for converting to a modified image; and
causing one of the selected first image or the modified image to be displayed in the communication thread, including:
if the selected first image is determined as not compatible for converting to the modified image, causing the selected first image to be displayed in the communication thread; and
if the selected first image is determined as compatible for converting to the modified image, analyzing user attribute settings of the first user or the second user to determine if at least one of the first user or the second user has a user attribute setting corresponding to a customizable aspect of the selected first image, and:
a first mode: if the user attribute settings do not correspond to the customizable aspect of the selected first image, causing the selected first image to be displayed in the communication thread; and
a second mode: if one or more of the user attribute settings correspond to the customizable aspect of the selected first image, generating the modified image based on the selected first image according to the one or more user attribute settings and causing the generated modified image to be displayed in the communication thread.

18. The computer system of claim 1, wherein the operations comprise:
causing a plurality of selectable images to be displayed to the first user,
wherein receiving the selection of the first image comprises receiving the selection of the first image by the first user from the plurality of selectable images displayed to the first user.

19. The method of claim 15, comprising:
causing a plurality of selectable images to be displayed to the first user,
wherein receiving the selection of the first image comprises receiving the selection of the first image by the first user from the plurality of selectable images displayed to the first user.

20. The computer system of claim 17, wherein the operations comprise:
causing a plurality of selectable images to be displayed to the first user,
wherein receiving the selection of the first image comprises receiving the selection of the first image by the first user from the plurality of selectable images displayed to the first user.

* * * * *